US012122258B2

(12) United States Patent
Ewert et al.

(10) Patent No.: US 12,122,258 B2
(45) Date of Patent: Oct. 22, 2024

(54) METHOD FOR OPERATING A CHARGING STATION FOR VEHICLES

(71) Applicant: Mahle International GmbH, Stuttgart (DE)

(72) Inventors: Sebastian Ewert, Stuttgart (DE); Max Gerstadt, Stuttgart (DE); Nicole Heinrich, Freiberg (DE); Walter Krepulat, Stuttgart (DE)

(73) Assignee: Mahle International GmbH (DE)

( * ) Notice: Subject to any disclaimer, the term of this patent is extended or adjusted under 35 U.S.C. 154(b) by 627 days.

(21) Appl. No.: 17/422,738

(22) PCT Filed: Jan. 10, 2020

(86) PCT No.: PCT/EP2020/050519
§ 371 (c)(1),
(2) Date: Jul. 13, 2021

(87) PCT Pub. No.: WO2020/148181
PCT Pub. Date: Jul. 23, 2020

(65) Prior Publication Data
US 2022/0126721 A1 Apr. 28, 2022

(30) Foreign Application Priority Data
Jan. 14, 2019 (DE) .......................... 102019200342.7

(51) Int. Cl.
*B60L 53/63* (2019.01)
*B60L 53/62* (2019.01)
*H02J 3/14* (2006.01)
*H02J 3/26* (2006.01)
*H02J 7/00* (2006.01)

(52) U.S. Cl.
CPC ............. *B60L 53/63* (2019.02); *B60L 53/62* (2019.02); *H02J 3/14* (2013.01); *H02J 7/0048* (2020.01); *H02J 7/00712* (2020.01); *H02J 3/26* (2013.01)

(58) Field of Classification Search
USPC ...................................................... 320/109
See application file for complete search history.

(56) References Cited

U.S. PATENT DOCUMENTS

| 9,168,838 | B2* | 10/2015 | Kuribayashi | ........... B60L 53/14 |
| 9,876,353 | B2* | 1/2018 | Eckert | .................... B60L 53/65 |
| 10,239,409 | B2 | 3/2019 | Herke | |
| 2011/0202192 | A1* | 8/2011 | Kempton | ................. H02J 3/008 |
| | | | | 320/109 |
| 2011/0245987 | A1* | 10/2011 | Pratt | ....................... G05B 15/02 |
| | | | | 320/132 |
| 2018/0358837 | A1* | 12/2018 | Sakakibara | .......... H02J 7/00714 |
| 2022/0126721 | A1* | 4/2022 | Ewert | ..................... B60L 53/51 |

FOREIGN PATENT DOCUMENTS

| CN | 103782477 A | 5/2014 |
| CN | 104704699 A | 6/2015 |
| CN | 106240384 A | 12/2016 |
| CN | 106314172 A | 1/2017 |
| CN | 108541242 A | 9/2018 |
| DE | 102012218889 A1 | 4/2014 |
| DE | 202013012651 U1 | 2/2018 |
| DE | 102017100138 A1 | 7/2018 |
| EP | 3184352 A1 | 6/2017 |
| WO | 2016124446 A1 | 8/2016 |
| WO | 2017109094 A1 | 6/2017 |
| WO | 17/157463 A1 | 9/2017 |
| WO | 2018127307 A1 | 7/2018 |

OTHER PUBLICATIONS

Chinese Office Action dated Nov. 17, 2023 and Chinese Search Report dated Nov. 13, 2023 for Chinese Patent Application No. 2020800076771.
English abstract of DE-102017100138.
English abstract for DE-202013012651.
European Office Action dated May 25, 2023 for European Patent Application No. 20 700 780.8.
Chinese Office Action dated May 15, 2024 and Chinese Search Report dated May 13, 2024 for Chinese Application No. 2020800076771.

* cited by examiner

*Primary Examiner* — Mohammed Alam
(74) *Attorney, Agent, or Firm* — Fishman Stewart PLLC

(57) ABSTRACT

A method for operating a charging station for vehicles may include suppling the charging station with electric energy via a multiple phase supply system, providing, by the charging station, multiple phase lines for an electric power supply of vehicles, supplying a vehicle a charging current via a phase line, measuring at least one supply system voltage that is present on the phase line that supplies the vehicle with the charging current, comparing the measured at least one supply system voltage and a stored rated voltage range, and adjusting the charging current if the measured at least one supply system voltage is outside the stored rated voltage range.

20 Claims, No Drawings

METHOD FOR OPERATING A CHARGING STATION FOR VEHICLES

CROSS-REFERENCE TO RELATED APPLICATIONS

This application claims priority to International Patent Application No. PCT/EP2020/050519 filed Jan. 10, 2020, which also claims priority to German Patent Application DE 10 2019 200 342.7 filed Jan. 14, 2019, each of which is hereby incorporated by reference in its entirety.

TECHNICAL FIELD

The present invention relates to a method for operating a charging station for vehicles with an electric energy store and a charging station, which are designed for carrying out such a method.

Vehicles with an electric energy store, in particular hybrid and/or electric vehicles, can be supplied with electric energy via a charging station. The charging stations suitable for this purpose are incorporated in a multi-phase, in particular three-phase voltage supply system, wherein a charging station provides multiple phase lines for the electric power supply of the vehicles. Charging the electric energy store of the respective vehicle is performed by single phase, wherein the vehicle is supplied with a charging current via a phase line. Here, a plurality of vehicles can be supplied with corresponding charging currents via a phase line.

Since an intermediate storage of the electric energy in the voltage supply system is not provided, it is necessary for a stable operation of the voltage supply system that the produced electric energy substantially corresponds to the electric power drawn by electrical consumers. If consumption and energy generation are no longer in harmony, this has a negative effect on the stability of supply system voltage and supply system frequency. Such electrical consumers are for example vehicles with an electric energy store during a charging operation.

BACKGROUND

In the prior art it is known that, for example by way of a ripple control signal and a corresponding device, vehicles can be completely separated from the respective voltage supply system during a charging operation when the electric power drawn by the consumers is greater than the electric energy made available by the voltage supply system.

Frequently, with charge outputs above 11 kW a separate energy counter is installed, which is combined with a contactor and completely disconnects the vehicle upon supply system overloading by way of ripple control signal by the supply supply system operator.

Disadvantageous in this is that in many cases the vehicles, after such a disconnection of the charging operation, cannot be coupled into the voltage supply system again without vehicle driver action. Thus it can happen that the vehicle, although it has been connected to the charging station for a predefined period of time, still does not show a charged electric energy store. A further disadvantage is that upon an excess of electric energy in the voltage supply system, these vehicles are no longer direction available as electrical consumers.

The present invention is based on the object of stating a method for operating a charging station for vehicles with an electric energy store, which compared with the prior art, makes possible an improved stabilisation of the voltage supply system.

According to the invention, this problem is solved through the subjects of the independent claims. Advantageous embodiments are subject of the dependent claims.

SUMMARY

The present invention is based on the general idea of employing the vehicles connected to a charging station as regulatable electrical load for stabilising the voltage supply system during a charging operation.

The method for operating a charging station for vehicles with an electric energy store according to the invention provides that the charging station is supplied with electric energy via a multi-phase voltage supply system. Here, the voltage supply system can be sub-divided into a high-voltage supply system with electric voltages above 50 kV and a low-voltage supply system with electric voltages below 1 kV. It can be provided that the charging station is supplied with electric energy via a multi-phase, in particular a three-phase low-voltage supply system. A line of a three-phase low-voltage supply system can comprise three phase lines and a neutral conductor, wherein the effective voltage, at a rated supply system frequency of 50 Hz, can be 230 V between any phase line and the neutral conductor, wherein the effective voltage between any two phase lines can be 400 V.

The charging station provides multiple, in particular three, phase lines for the electric power supply of vehicles, wherein at least one vehicle, is supplied with a charging current via a phase line.

With the method according to the invention, at least one supply system voltage, which is present on the phase line that supplies a vehicle with a charging current, is measured. A comparison is made between the measured supply system voltage and a stored rated voltage range, wherein an adjustment of the charging current takes place in the case that the measured supply system voltage is outside the stored rated voltage range. The effective value of the supply system voltage of the respective phase line with respect to a neutral conductor can be determined upon a measurement of the supply system voltage. The rated voltage range can be for example 230 V, ±10%, preferably 230 V ±5%, particularly preferably 230 V ±1%.

By way of this, the voltage supply system, in particular a low-voltage supply system, can be advantageously phase-individually stabilised.

Additionally, the supply system frequency can also be measured, compared with a rated supply system frequency range and an adjustment of the charging current performed in the case that the measured supply system frequency is outside the stored rated range.

In an advantageous further development of the solution according to the invention, it is provided that multiple vehicles are each supplied with charging currents via multiple phase lines. Here it can also be provided that multiple vehicles are supplied with currents via a common phase line.

It is provided that all supply system voltages, which are present on the phase lines, are measured, wherein the measurement of the supply system voltage of the respective phase line takes place individually. Furthermore it is provided that a comparison between the measured supply system voltages and a stored rated voltage range is carried out in each case, wherein an adjustment of the charging current and/or of the charging currents of the respective phase line takes place in the case that the measured supply system voltage of the respective phase line is outside the stored rated voltage range.

Thus, a phase-individual adjustment of the electrical load is made possible, so that for example an unbalanced load in the voltage supply system can be compensated or offset. Such a phase-individual adjustment is not possible by means of a ripple control signal. Additionally, consumers, in particular charging vehicles, which are connected to a phase line or phases that are not overloaded, are not restricted or disconnected in contrast with a disconnection by a ripple control signal control.

In a further advantageous embodiment of the solution according to the invention it is provided that the measurement of the supply system voltage and/or the comparison with the stored rated voltage range and/or the adjustment of at least one charging current of a phase line and/or of all phase lines takes place continuously, in particular once per second. The term continuously can mean that the method steps to be carried out are carried out at predefined time intervals, in particular at equidistant time intervals. By way of this, a prompt stabilisation of the voltage supply system, in particular of a low-voltage supply system, is possible.

In an advantageous further development of the solution according to the invention it is provided that when carrying out the adjustment at least one charging current of the respective phase line is reduced in the case that it follows from the comparison between the respective measured supply system voltage and the stored rated voltage range that the measured supply system voltage is smaller than a minimum value of the rated voltage range. By way of this, the electrical load present on the respective phase line can be reduced in order to achieve an adequate stability of the voltage supply system, in particular of a low-voltage supply system.

The reduction of the charging current can substantially take place steadily or suddenly or in stages. Upon a sudden or step-by-step reduction of the charging current, predetermined and/or stored charging current values can be adjusted.

In a further advantageous embodiment of the solution according to the invention it is provided that when performing the adjustment, at least one charging current of the respective phase line is increased in the case that it follows from the comparison between the respective measured supply system voltage and the stored rated voltage range that the measured supply system voltage is greater than a maximum value of the rated voltage range. By way of this, the electrical load that is present on the respective phase line can be increased in order to achieve an adequate stability of the voltage supply system, in particular of a low-voltage supply system. In particular when employing regenerative energy sources, such as for example wind and/or solar energy sources, the energy made available by the voltage supply system follows a volatile course, in the case of which an oversupply of electric energy is also available at times, which has to be absorbed in a suitable manner by the electrical consumers that are connected to the voltage supply system.

The increase of the charging current can substantially take place steadily or suddenly or in stages. Upon a sudden or step-by-step increase of the charging current, predetermined and/or stored charging current values can be adjusted. It can be provided that a maximum charging current is specified and/or stored which must not be exceeded in order to prevent a destruction of the respective vehicle or of the energy store.

In an advantageous development of the solution according to the invention it is provided that in the case of multiple vehicles, which are supplied with charging currents by a phase line, a priority time, at which the vehicle was connected to the phase line is stored for each vehicle. An adjustment of the charging currents to a phase line initially takes place for individual vehicles according to the priority time, wherein the adjustment of the charging current is initially carried out for the vehicle with the earliest priority time.

When multiple vehicles, in particular electric vehicles, are charged via an overloaded phase line, the vehicle which has been charging the longest, i.e. has the earliest priority time, is first reduced in the charging current according to a first come first served strategy. Accordingly, an optimal compromise between a charging of the energy stores of the vehicles and a contribution to the stabilisation of the voltage supply system, in particular of a low-voltage supply system, is achieved.

In the following, this embodiment of the method is explained by way of an example. Exemplarily it is assumed that three vehicles are charged via a phase or phase line L1, wherein the first vehicle is charged six hours, the second vehicle three hours and the third vehicle one hour via the phase line. Should it follow from the comparison between the measured supply system voltage of phase L1 and the stored rated voltage range that the measured supply system voltage is smaller than a minimum value of the rated voltage range, the charging current of the first vehicle is reduced to a minimum value. Should the supply system voltage fail to recover by way of this load change, the charging current of the second vehicle is reduced to a minimum value. Should the supply system voltage fail to recover through this load change, the charging current of the third vehicle is reduced to a minimum value.

In a further advantageous embodiment of the solution according to the invention it is provided that on a phase line no charging currents are made available in the case that the measured supply system voltage is outside a stored limit voltage range. Here it can be provided that the charging operation of all vehicles that are connected to this phase line is interrupted. By way of this, a failure of further consumers because of the insufficient supply system voltage can be prevented. Additionally, damaging transformers and/or supply lines can be prevented. The limit voltage range can comprise the rated voltage range.

In an advantageous further development of the solution according to the invention it is provided that the adjustment of the charging current or of the charging currents takes place in 1A steps. By way of this, a finer and/or smaller-step adjustment of the electrical load compared with the prior art is possible, so that between the electric energy in the voltage supply system made available and the electric energy needed by the electrical consumers an equilibrium can be reached.

In a further advantageous embodiment of the solution according to the invention it is provided that at least one supply system frequency, which is present on at least one phase line, is measured, wherein a comparison between the measured supply system frequency and a stored rated frequency range is carried out, wherein an adjustment of at least one charging current takes place when the measured supply system frequency is outside the rated frequency range.

By way of this, a stabilisation of a high-voltage supply system is possible in addition to a stabilisation of a low-voltage supply system.

In an advantageous further development solution according to the invention it is provided that an adjustment of all charging currents of all phase lines takes place. By way of this, an even loading and/or unloading of the individual phases or phase line can be achieved.

In a further advantageous embodiment of the solution according to the invention it is provided that the measurement of the supply system frequency and/or the comparison with the stored rated frequency range and/or the adjustment of a charging current takes place continuously, in particular once per second. The term continuously can mean that the method steps to be carried out are carried out at predefined time intervals, in particular at equidistant time intervals. By way of this, a central stabilisation of the voltage supply system, in particular of a high-voltage supply system is possible.

In an advantageous further development of the solution according to the invention is provided that while carrying out the adjustment at least one charging current of the respective phase line is reduced in the case that it follows from the comparison between the respective measured supply system frequency and the stored rated frequency range that the measured supply system frequency is smaller than the minimal value of the rated frequency range.

In a further advantageous embodiment of the solution according to the invention it is provided that when carrying out the adjustment at least one charging current of the respective phase line is increased in the case that it follows from the comparison between the respective supply system frequency and the stored rated frequency range that the measured supply system frequency is greater than a maximum value of the rated frequency range. An increase of the respective charging current for charging the vehicles can take place up to a limit value of the supply system load capacity of the low-voltage supply system and/or up to a limit value of the load value of the vehicle or of the energy store.

In the following, this embodiment of the method is explained by way of an example. Exemplarily it is assumed that four vehicles are charging via a phase or phase line of the low-voltage supply system, wherein an infrastructure limit, for example because of a protection of a house connection, is around an accumulated current of 63 A (and parameterized in a load management software). Assuming that the vehicles are charged, because of a specification regarding the own consumption, the use of photovoltaic systems or for reducing the peak consumption, at an accumulated limit charging current of 32 A, this specification can be overridden when a supply system frequency of above for example 50.5 Hz is determined. Each of the vehicles is offered higher charging currents and regulated by the method according to the invention to the infrastructure limit value of 63 A. This regulation can take place individually for all phases of the low-voltage supply system, wherein specifications regarding the unbalanced load are also adhered to.

In an advantageous further development of the solution according to the invention it is provided that on all phase lines no charging currents are made available in the case that the measured supply system frequency is outside a stored limit frequency range. A lower limit frequency range of the limit frequency range can be 47.5 Hz. The limit frequency range can include the rated frequency range.

Furthermore, the invention relates to a charging station for vehicles having an electric energy store. The charging station according to the invention comprises at least one frequency measuring device and/or at least one voltage measuring device. Furthermore, the charging station according to the invention includes a control device which is designed and/or programmed for carrying out the method according to the invention, wherein the frequency measuring device and/or the voltage measuring device is communicatingly connected to the control device.

This charging station can carry out a simultaneous stabilising of the low-voltage and of the high-voltage supply system in that measurements of the supply system voltage and/or of the supply system frequency are carried out, wherein upon deviations of set point values and/or set point value ranges a phase-individual regulation of the charging currents, in particular according to DIN EN 50 160 takes place.

It is to be understood that the features mentioned above and still to be explained in the following cannot only be used in the respective combinations stated but also in other combinations or by themselves without leaving the scope of the present invention.

The invention claimed is:

1. A method for operating a charging station for vehicles having an electric energy store, the method comprising:
   supplying the charging station with electric energy via a multi-phase supply system;
   providing, by the charging station, multiple phase lines for an electric power supply of vehicles;
   supplying a vehicle a charging current via a phase line;
   measuring at least one supply system voltage that is present on the phase line that supplies the vehicle with the charging current;
   comparing the measured at least one supply system voltage and a stored rated voltage range;
   adjusting the charging current if the measured at least one supply system voltage is outside the stored rated voltage range;
   measuring at least one supply system frequency that is present on the phase line;
   comparing the measured at least one supply system frequency and a stored supply system frequency; and
   adjusting the charging current when the measured supply system frequency is outside the stored rated frequency range.

2. The method according to claim 1, including:
   supplying multiple vehicles with charging currents via multiple phase lines;
   measuring supply system voltages that are present on the multiple phase lines, wherein a measurement of a voltage of a respective phase line takes place individually;
   comparing the measured supply system voltages and the stored rated voltage range; and
   adjusting the charging current and/or of the charging currents of the respective phase line if the measured supply system voltage of the respective phase line is outside the stored rated voltage range.

3. The method according to claim 2, wherein measuring at least one supply system voltage, and/or comparing the measured supply system voltage and the stored rated voltage range, and/or adjusting the charging current of a phase line and/or of all phase lines takes place continuously.

4. The method according to claim 3, wherein adjusting at least one charging current of the respective phase line is reduced if a comparison between the respective measured supply system voltage and the stored rated voltage range is smaller than a minimum value of the stored rated voltage range.

5. The method according to claim 4, wherein adjusting at least one charging current of the respective phase line is increased if a comparison between the respective measured supply system voltage and the stored rated voltage range is greater than a maximum value of the stored rated voltage range.

6. The method according to claim 5, wherein with multiple vehicles that are supplied with charging currents by a phase line, a priority time that a vehicle was connected to the phase line is stored for each vehicle.

7. The method according to claim 6, wherein on a phase line, no charging currents are made available if the measured supply system voltage is outside a stored limit voltage range.

8. The method according to claim 7, wherein the adjustment of the charging current or of the charging currents takes place in 1 step.

9. The method according to claim 1, wherein an adjustment of all charging currents of all phase lines takes place.

10. The method according to claim 1, wherein measuring the at least one supply system frequency, and/or comparing the measured supply system frequency and the stored supply system frequency, and/or adjusting at least one charging current when the measured supply system frequency is outside the stored rated frequency range takes place continuously.

11. The method according to claim 1, wherein adjusting at least one charging current of the respective phase line is reduced if a comparison between the respective measured supply system frequency and the stored rated frequency range that the is smaller than a minimum value of the stored rated frequency range.

12. The method according to claim 1, wherein adjusting at least one charging current of the respective phase line is increased if a comparison between the respective measured supply system frequency and the stored rated frequency range is greater than a maximum value of the stored rated frequency range.

13. The method according to claim 1, wherein on all phase lines no charging currents are made available if the measured supply system frequency is outside a stored limit frequency range.

14. The method according to claim 1, wherein
a charging of the electric energy store of the respective vehicles takes place by single phase, and wherein the vehicle is supplied with a charging current via a phase line, and/or
the vehicles connected to the charging station are used as regulatable electric load for stabilizing the voltage supply system during a charging operation.

15. A charging station for vehicles having an electric energy store, comprising:
a frequency measuring device and/or a voltage measuring device;
a phase line for supplying a vehicle a charging current;
a controlled device,
wherein the frequency measuring device and/or the voltage measuring device are communicatingly connected to the control device;
wherein the control device is configured to:
measure at least one supply system voltage via the voltage measuring device that is present on the phase line;
compare the measured at least one supply system voltage and a stored rated voltage range;
adjust the charging current if the measured at least one supply system voltage is outside of the stored rated voltage range;
measure at least one supply system frequency via the frequency measuring device that is present on the phase line;
compare the measured at least one supply system frequency and a stored supply system frequency; and
adjust the charging current when the measured supply system frequency is outside of the stored rated frequency range.

16. The method according to claim 2, wherein measuring at least one supply system voltage, and/or comparing the measured at least one supply system voltage and a stored rated voltage range, and/or adjusting the charging current of a phase line and/or of all phase lines takes place once per second.

17. The method according to claim 6, wherein an adjustment of the charging currents on a phase line is initially carried out for individual vehicles according to the priority time.

18. The method according to claim 6, wherein an adjustment of the charging current is initially carried out for a vehicle with an earliest priority time.

19. The method according to claim 1, wherein the stored rated voltage range is 230 V±10%.

20. A method for operating a charging station for vehicles having an electric energy store, the method comprising:
supplying the charging station with electric energy via a multi-phase supply system;
providing, by the charging station, multiple phase lines for an electric power supply of vehicles;
supplying multiple vehicles with charging currents via multiple phase lines;
measuring supply system voltages that are present on the multiple phase lines that supply the multiple vehicles with the charging current, wherein a measurement of a rated voltage of a respective phase line takes place individually;
comparing the measured supply system voltages and a stored rated voltage range; and
adjusting the charging current and/or of the charging currents of the respective phase line if the measured supply system voltage of the respective phase line is outside the stored rated voltage range.

* * * * *